June 17, 1947.  J. RAZEK  2,422,313
TELMETERING SYSTEM
Filed Feb. 18, 1944
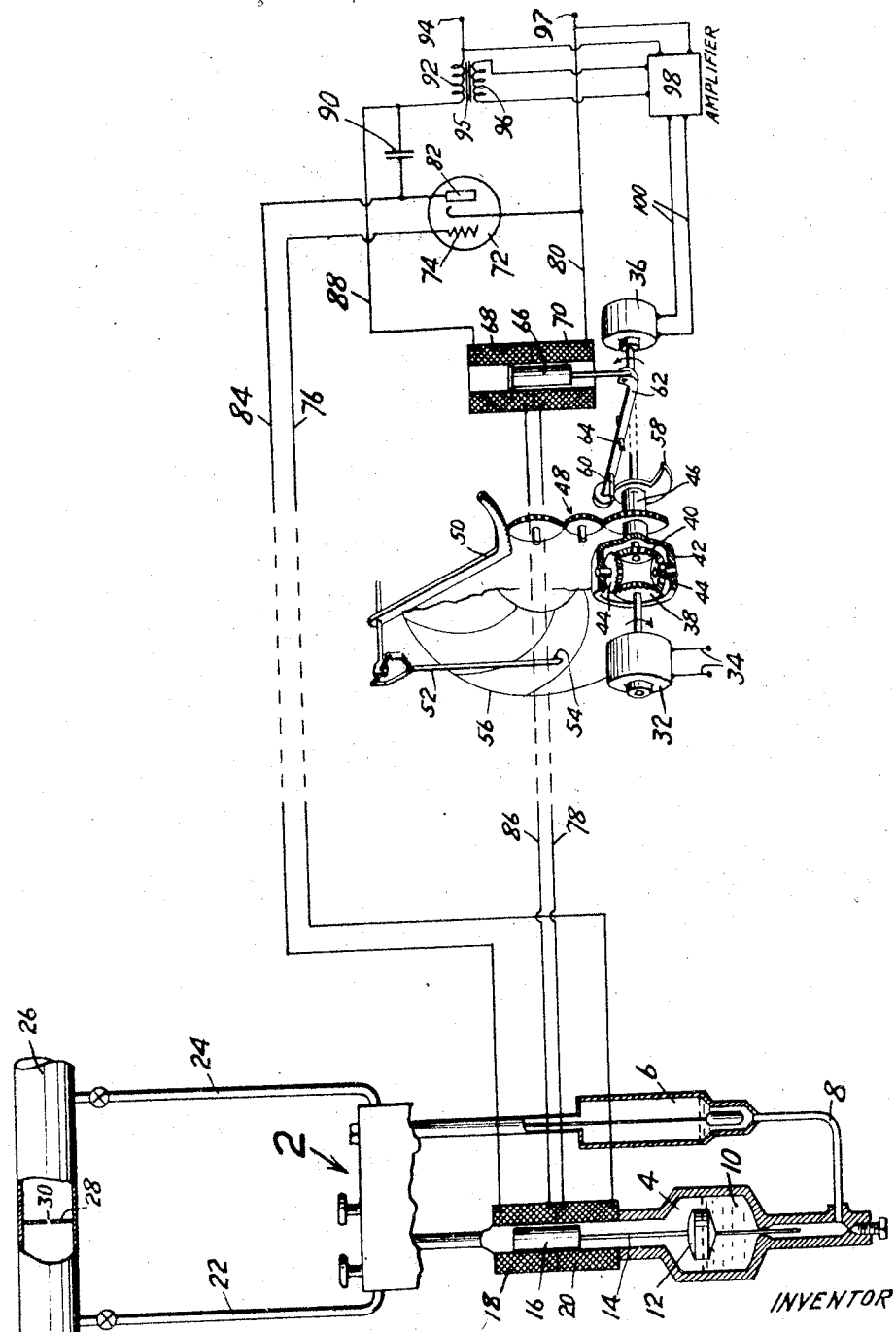
INVENTOR
Joseph Razek
BY
ATTORNEYS.
WITNESS:

Patented June 17, 1947

2,422,313

UNITED STATES PATENT OFFICE 2,422,313

TELEMETERING SYSTEM

Joseph Razek, Llanerch, Pa., assignor, by mesne assignments, to H S B Corporation, a corporation of Pennsylvania Application February 18, 1944, Serial No. 522,915

6 Claims. (Cl. 177—351)

This invention relates to a telemetering system particularly adapted to provide a high speed response without hunting.

In a telemetering device it is desirable that a receiver element have a high speed of response to changes in position of a transmitter element and that the response be accurate to a high degree. This double requirement of both high speed and high sensitivity generally leads to a hunting action which is very unsatisfactory. In many cases the devices for preventing hunting are substantially more intricate than the basic telemetering device itself, with the result that satisfactory telemetering devices are both intricate and expensive.

The present invention is directed to a telemetering device operating on a principle which precludes hunting and at the same time provides both high speed of response and a very high degree of accuracy thereof.

The broad object of the invention relating to the attainment of these ends as well as specific objects relating to matters of construction and other details will become clear from the following description read in conjunction with the accompanying drawing, in which the figure represents in sectional diagram, and partially in perspective, a telemetering system provided in accordance with the present invention and applied to a flowmeter.

The transmitter shown at the left of the figure is a flowmeter which will be recognized as structurally a Cochrane type transmitter such as heretofore has been used in conjunction with a bridge type telemetering system.

The meter indicated generally at 2 comprises a manometer consisting of the legs 4 and 6 joined by a connecting tube 8 and containing mercury or other liquid indicated at 10. A float 12 located in the leg 4 is provided with a stem 14 carrying an iron plunger 16 which provides a movable core for a pair of coils 18 and 20 wound about a nonmagnetic portion of the manometer leg. This meter is arranged in service with the ends of the manometer connected by tubes 22 and 24 to the portions of a fluid line 26 on opposite sides of a diaphragm 28 having an orifice 30. The levels assumed by the mercury in the manometer legs and, therefore, the position of the plunger or core 16 will be a function of the flow through the pipe 26 so that the position of the plunger, if transmitted to a suitable indicating or recording device, will constitute a measure of the flow. What has been so far described is a conventional Cochrane transmitter which, in its prior use, has effected unbalance of a suitable bridge circuit containing the coils 18 and 20 by reason of the variation of their inductances due to changes in position of the plunger 16.

In accordance with the present invention, the receiver is of a novel type illustrated at the right-hand side of the figure. It comprises a synchronous motor 32 connected to a standard frequency supply line, for example having a frequency of sixty cycles, at 34. This motor may be of a conventional clockwork type having internal reduction gearing and arranged to provide a rotation of its output shaft at some fixed speed such as 1 R. P. M. or other relatively slow rate such as some small multiple of this rate.

A second similar motor is provided at 36 and, as will be made clear hereafter, is supplied with a variable frequency current so that its shaft will, when the receiver is not in equilibrium, rotate faster or slower than the shaft of the motor 32, while at equilibrium it will rotate at the same speed. The respective directions of rotation of the shafts of these motors are indicated by the arrows.

The shafts of the motors 32 and 36 carry respectively bevel gears 38 and 40 which mesh with a pair of planetary bevel gears 44 journaled in a housing 42 which may be conveniently mounted by having a sleeve 46 thereof embracing one of the shafts. The gears 38 and 40 being of the same pitch diameter, it will be evident that when the motors 32 and 36 are operating at the same speed, the sleeve 46 will be stationary. Whereas, when the speed of the motor 36 is greater than or less than the speed of the motor 32, the sleeve 46 will rotate either counter-clockwise or clockwise respectively, as viewed from the left of the figure.

The sleeve 46 drives through a train of gearing indicated at 48 a gear segment 50 which is connected in conventional fashion with a stylus 52, the marking point 54 of which moves in contact with a chart 56 which may be rotated at slow speed by means of a clockwork mechanism or, simply, by gearing from the fixed speed motor 32 so as to provide a polar graph of flow rate against time. The actual recording devices driven by the gearing 48 are also conventional and may take the form of the well-known Cochrane recording devices, being associated for example, with an integrating system driven by the same or additional gearing, which need not be illustrated herein.

The sleeve 46 additionally carries a cam 58 arranged to act upon a follower pin 60 of a lever 62 pivoted at 64 and connected to an iron plunger 66, the lever being suitably counter-weighted to keep the follower pin 60 in contact with the cam. The plunger 66 is arranged to move within coils 68 and 70 across the adjacent ends of these coils so as to vary their inductances.

In the present system the coils 18, 20, 68, and 70 form part of a vacuum tube oscillator which includes a tube 72, illustrated as a triode but which may be a tube of tetrode, pentode, or other type depending upon the particular oscillator circuit which is used. In the present instance the oscillator circuit is of the tuned plate variety with inductive coupling to the grid. The grid 74 is connected through the line 76 to one end of the coil 20, the other end of which is connected through the line 78 with one end of the coil 70, the opposite end of which is returned through the connection 80 to the cathode of the tube. The plate 82 is connected through the line 84 to one terminal of the coil 18, the other terminal of which is connected through the line 86 to a terminal of the coil 68, the other terminal of which is joined through the line 88 and the fixed condenser 90 to the plate. It will be evident that the circuit thus provided involves the series connection of the coils 68 and 18 in parallel with the condenser 90 to provide a tank circuit for the oscillator, feed back to the grid being provided through the mutual inductances of the coils 18 and 20 and 68 and 70, the coils 20 and 70 being in series. All of the coils, of course, are wound in the proper directions to give proper feed-back action as well known in the art of electron tube oscillators. The output of the oscillator circuit is fed through a transformer 95 to an amplifier 98, the primary 92 of the transformer 95 being connected in the high voltage D. C. supply lead from the supply terminal 94, and the secondary 96 feeding the amplifier. The low voltage or ground connection is indicated at 97. In the event that the grid is required to have a bias by reason of the type of tube used, this may be secured either by connection of the grid return 80 to a suitable bias voltage supply rather than to the cathode, or by other conventional means such as a cathode resistor or a grid leak arrangement. The amplifier 98 which may be of conventional audio type involving one or more amplifying tubes, depending upon the power requirements of the motor 36, is arranged to feed driving current to the motor 36 through the connections 100.

The operation of the oscillator may be most simply understood if it is considered that the plungers 16 and 66 are identical, the coil 18 is the same as coil 68, and the coil 20 is the same as coil 70. While it will be evident that this need not be the case, on the basis of such assumption let it be assumed that the apparatus is initially in equilibrium with the plungers 16 and 66 in particular positions to provide a value of self-inductances of the coils 18 and 68 in parallel with the condenser to establish a frequency of the oscillator identical with the fixed frequency provided at 34, so that the motors 32 and 36 are running at the same speed with a resulting stationary condition of the sleeve 46. If there now occurs a sudden change of flow rate through the fluid line 26, the plunger 16 will assume a new position which, for the sake of explanation, may be assumed to be a lower position than that illustrated. The result of the downward movement of the plunger 16 will be to effect a lowering of inductance of the coil 18 with a resulting increase in frequency of the oscillator. This increase of frequency of the oscillator will cause a speeding up of the motor 36 which, in turn, will result in counter-clockwise movement of the cam 58 and a consequent rise of the plunger 66. At first, the frequency fed to the motor 36 will be substantially in excess of the fixed frequency supplied to the motor 32 with the result that the sleeve 46 will rotate rapidly in its counter-clockwise direction. As the plunger 66 is raised, the inductance of the coil 68 will increase and, consequently, the frequency of the oscillator will decrease, slowing down the motor 36. Ultimately, equilibrium will again be attained with the inductance of coil 68 increased to the same extent as the inductance of the coil 18 was decreased, whereupon the oscillator frequency will again be the same as the fixed supply frequency to the motor 32, and both motors will again operate at the same speed with the result that the sleeve 46 will be stationary. It will be noted that under these conditions the inductances of the coils 20 and 70 will again add up to substantially the same value as that existing before the disturbance, so that the mutual inductances involved in the feed back to the grid will also be substantially the same with the result that, from the electrical standpoint, the oscillator will involve the same values of self and mutual inductances as originally.

While the conditions just mentioned are desirably approached in order that the oscillator will operate through a wide range of adjustment of the movable elements under essentially the same electrical conditions, a well-stabilized oscillator does not require these conditions to exist, and within limitations which will be readily apparent to those skilled in the art of design of oscillators, the various coils may depart quite widely from physical correspondence, while, nevertheless, position of the plunger 66 will in any new equilibrium bear some definite relationship to the position of the plunger 16. It will also be evident that the particular oscillator circuit is merely illustrative, and that many other oscillator circuits of conventional types may be used so long as they are such that their frequencies are dependent upon the inductances of the coils and are stable against temperature or other minor variations of other parts of the circuit. For example, the grid circuit, rather than the plate circuit, may be the tuned circuit, or a negative resistance oscillator of the so-called transitron type may be used as well as numerous variations of the Hartley or Colpitts circuits. Such variations will be readily evident to those skilled in the art.

As will be evident from the above, equilibrium involves some correspondence between the positions of the plungers 16 and 66. The particular correspondence between the position of the sleeve 46 and the plunger 16 will be defined by the contour of the cam 58, as will also be the position of the stylus point 54 with respect to the position of the plunger 16. Actually, in practice, the cam 58 is desirably so designed as to provide some definite relationship between the position of the recording point 54 and the rate of flow, for example, so as to secure a linear response on the chart with respect to the rate of flow. Such design of the cam 58 may follow conventional practice as, for example, is used in the conventional Cochrane flowmeter system.

For proper operation it will be evident that a fixed frequency should be supplied to the motor 32. In most localities at the present time the alternating current frequency supplied for power use is very closely controlled so that it may be used directly for the driving of the standard speed motor 32. In the event, however, that only direct current is available or the alternating current supply is not held constant, an additional oscillator having a fixed frequency, controlled, for example, by a tuning fork, may be provided to insure constant speed of operation of the motor 32.

As will be evident from the foregoing description of the operation, the speed of response of the receiver is dependent upon the extent of movement of the plunger 16 from a previously established equilibrium and thereafter upon the degree to which the position of the receiver plunger 66 approaches the new equilibrium position. By so arranging the circuit that the frequency change is quite large for small movements of the plungers, the rapidity of response of the system may be made very great. Nevertheless, the restoration of the plunger 66 to a new equilibrium position will occur in such fashion as to prevent hunting. That the sleeve 46 and the parts connected thereto cannot hunt or oscillate will be evident from the following:

If the inductances of coils 18 and 68 are $L_1$ and $L_2$, respectively, the oscillator frequency will, to a close approximation, be given by $$f = K(L_1 + L_2)^{-\frac{1}{2}}$$

wherein $$K = \frac{1}{2\pi\sqrt{C}}$$

Let $s$ be the displacement of sleeve 46 counterclockwise in contact with cam 58, the mass of the parts and the velocities being sufficiently small to avoid disturbance of the contact, $L_2$ will be a function of $s$, $L_2(s)$, the form of which depends upon the shape of cam 58 and other dimensions of the receiving system. Since the speeds of the motors 32 and 36 are proportional to the fixed frequency $f_0$ and the oscillator frequency $f$ respectively, a condition which will exist if light parts are used and friction imposes no such load as will cause the motors to depart from synchronous operation to any appreciable extent, the counterclockwise velocity $\dot{s}$ of the sleeve 46 will be proportional by reason of the planetary gear arrangement, to the difference of the frequencies, or:

$$\dot{s} = K_1(f - f_0)$$

$$\dot{s} = K_1\{K[L_1 + L_2(s)]^{-\frac{1}{2}} - f_0\}$$

The last is the differential equation corresponding to any given value for $L_1$ dependent upon a given position of the plunger 16, and solution thereof gives the displacement-time characteristic of sleeve 46.

Differentiation shows that $\ddot{s}$ will be a product of $\dot{s}$ with finite terms so that when $\dot{s}=0$, $\ddot{s}=0$, precluding the motion from being oscillatory.

The various advantages of the system may be summarized as follows:

Physical contact need not be made with the element whose position is to be recorded. For example, the core 16 may be inside the manometer 2 while the coils the inductances of which it varies may be outside. This means that the transmitter plunger may be within a device in which very high pressures may exist, or which may contain noxious vapors or the like.

The speed of rebalancing is roughly proportional to the amount of unbalance resulting in high speed of restoration of balance but without hunting as indicated above.

The system operates on a basis of change in frequency, and at the low frequencies of oscillation involved the oscillator circuit may be made quite independent of input voltage, temperature changes, and other disturbances.

The elements bringing about rebalance, namely, the motors 32 and 36, are continuously running which means that not only is there avoided any dead region or zone such as will result when a rebalancing system comes to rest between operations but there is no starting friction involved. The motors, furthermore, can be made sufficiently large to secure ample torque for any indicating or recording system involving, for example, integration to give the total amount of flow or the like over an extended period.

There is no sensitive element required as, for example, a sensitive galvanometer or relays or the like to determine the direction in which the system should operate for rebalancing. Consequently, the system may be used on board ships or aircraft or in other locations which may be subject to violent motion or vibration.

While the system has been described with particular reference to the metering of flow of fluid, it will be evident that this is merely one useful application thereof, and that, in fact, the system may be used quite generally for telemetering purposes. The position of a transmitting plunger, such as 16, for example, may be responsive to liquid level, pressures, temperatures, speeds, or many other variables, indications of which it is desired to transmit either for mere observation, or for recording or control purposes. In fact, the relations between various quantities may also be transmitted by having both a plunger, such as 16, and one or more associated coils, such as 18 and 20, individually movable in accordance with variations in independent variables. For example, by making one movable as a function of speed, and the other movable as a function of flow or the like, the quantity transmitted for recording, observation, or control may be some combined function of the initial variables, as, for example, in the particular case just mentioned, the quantity transmitted might be the extent of motion of a vehicle or the like per unit quantity of fuel. In such cases, transmission to substantial distances may not be involved, but the invention may be applied to the local transmission of some desired function to an indicator or recorder. It will be noted, however, that the distance of transmission may be very great with this system, particularly since it involves the use of low oscillator frequencies which make the length of the transmission line relatively immaterial from the standpoint of distributed inductances and capacities which it may introduce.

It will be understood, therefore, that the invention is not to be construed as limited except to the extent specified in the following claims.

What I claim is:

1. In combination, indicating means, a pair of electric motors, means connecting both of said motors to the indicating means to effect movements of the indicating means in accordance with variations in the relative speeds of said motors, means for generating alternating current, means connecting said generating means with one of said motors, the motor operating at variable speed dependent upon the frequency of current produced by the generating means, a transmitting device for varying the frequency generated by the generating means, and means connected to said indicating means and comprising a variable impedance in the circuit of said generating means for varying the frequency generated by the generating means, the other of said motors being arranged to operate at substantially constant speed.

2. In combination, indicating means, a pair of electric motors, means connecting both of said motors to the indicating means to effect movements of the indicating means in accordance with variations in the relative speeds of said motors, means for generating alternating current, means connecting said generating means with one of said motors, the motor operating at variable speed dependent upon the frequency of current produced by the generating means, a transmitting device for varying the frequency generated by the generating means, and means connected to said indicating means and comprising a variable impedance in the circuit of said generating means for varying the frequency generated by the generating means, the other of said motors being arranged to operate at substantially constant speed, the last mentioned means for varying the generated frequency serving to restore the variable speed motor to a speed with respect to the substantially constant speed motor to bring the indicating means to a stationary condition.

3. In combination, indicating means, a pair of electric motors, means connecting both of said motors to the indicating means to effect movements of the indicating means in accordance with variations in the relative speeds of said motors, means for generating alternating current comprising an electron tube oscillator, means connecting said generating means with one of said motors, the motor operating at variable speed dependent upon the frequency of current produced by the generating means, a transmitting device for varying the frequency generated by the generating means, and means connected to said indicating means and comprising a variable impedance in the circuit of said generating means for varying the frequency generated by the generating means, the other of said motors being arranged to operate at substantially constant speed.

4. In combination, indicating means, a pair of electric motors, means connecting both of said motors to the indicating means to effect movements of the indicating means in accordance with variations in the relative speeds of said motors, means for generating alternating current comprising an electron tube oscillator, means connecting said generating means with one of said motors, the motor operating at variable speed dependent upon the frequency of current produced by the generating means, a transmitting device for varying an impedance in the oscillator circuit thereby to vary the frequency generated by the generating means, and means connected to said indicating means for varying a second impedance in the oscillator circuit thereby to vary the frequency generated by the generating means, the other of said motors being arranged to operate at substantially constant speed.

5. In combination, indicating means, a pair of electric motors, means connecting both of said motors to the indicating means to effect movements of the indicating means in accordance with variations in the relative speeds of said motors, means for generating alternating current at a frequency adapted for the operation of one of said motors, means connecting said generating means with the last mentioned motor, the motor operating at variable speed dependent upon the frequency of current produced by the generating means, a transmitting device responsive to a mechanical displacement for varying the frequency generated by the generating means, and means connected to said indicating means for varying the frequency generated by the generating means in opposition to the variations in frequency effected by the transmitting device, the other of said motors being arranged to operate at substantially constant speed, said indicating means being indicative of said mechanical displacement.

6. In combination, indicating means, a pair of electric motors, means connecting both of said motors to the indicating means to effect movements of the indicating means in accordance with variations in the relative speeds of said motors, means for generating alternating current at a frequency adapted for the operation of one of said motors, means connecting said generating means with the last mentioned motor, the motor operating at variable speed dependent upon the frequency of current produced by the generating means, a transmitting device responsive to a mechanical displacement for varying the frequency generated by the generating means, and means remote from said transmitting device and connected to said indicating means for varying the frequency generated by the generating means in opposition to the variations in frequency effected by the transmitting device, the other of said motors being arranged to operate at substantially constant speed, said indicating means being indicative of said mechanical displacement.

JOSEPH RAZEK.

REFERENCES CITED

The following references are of record in the file of this patent:

UNITED STATES PATENTS

| Number | Name | Date |
| --- | --- | --- |
| 2,280,725 | Shepard | Apr. 21, 1942 |
| 1,907,132 | Thurston | May 2, 1933 |
| 2,303,654 | Newton | Dec. 1, 1942 |
| 1,928,793 | Poole | Oct. 3, 1933 |